United States Patent
Umezawa

(10) Patent No.: US 10,562,213 B2
(45) Date of Patent: Feb. 18, 2020

(54) DEVICE FOR PRODUCING INJECTION MOLDED BODY AND METHOD OF PRODUCING THE SAME

(71) Applicant: Mitsuba Corporation, Gunma (JP)

(72) Inventor: Takao Umezawa, Kiryu (JP)

(73) Assignee: Mitsuba Corporation, Gunma (JP)

( * ) Notice: Subject to any disclaimer, the term of this patent is extended or adjusted under 35 U.S.C. 154(b) by 261 days.

(21) Appl. No.: 15/535,706

(22) PCT Filed: Dec. 3, 2015

(86) PCT No.: PCT/JP2015/083955
§ 371 (c)(1),
(2) Date: Jun. 13, 2017

(87) PCT Pub. No.: WO2016/104090
PCT Pub. Date: Jun. 30, 2016

(65) Prior Publication Data
US 2017/0348883 A1    Dec. 7, 2017

(30) Foreign Application Priority Data
Dec. 22, 2014  (JP) .................... 2014-258589

(51) Int. Cl.
*B29C 45/06*    (2006.01)
*B29C 45/00*    (2006.01)
*B29C 45/16*    (2006.01)

(52) U.S. Cl.
CPC .......... *B29C 45/06* (2013.01); *B29C 45/0062* (2013.01); *B29C 45/1628* (2013.01)

(58) Field of Classification Search
CPC .. B29C 45/06; B29C 45/0062; B29C 45/1628
(Continued)

(56) References Cited

U.S. PATENT DOCUMENTS

| 5,221,538 A | 6/1993 | Gasami et al. |
| 5,413,743 A * | 5/1995 | Prophet ............... B29C 45/0062 264/1.7 |
| 7,951,322 B2 * | 5/2011 | Clark .................... B29C 45/045 264/261 |

FOREIGN PATENT DOCUMENTS

| JP | H0238377 | 8/1990 |
| JP | H06182806 | 7/1994 |

(Continued)

OTHER PUBLICATIONS

Office Action of China Counterpart Application, with English translation thereof, dated Jan. 18, 2019, pp. 1-13.

(Continued)

*Primary Examiner* — Francisco W Tschen
(74) *Attorney, Agent, or Firm* — JCIPRNET

(57) ABSTRACT

The present invention addresses the problem of manufacturing first and second members with different materials when molding injection molding body one after another using first to third molds disposed at 120 degrees from each other on a turntable that performs reciprocating motion at 120 degrees and using fourth to sixth molds provided opposite to the first to third molds, respectively. According to the solution, first to third injection devices are disposed on the sides of fourth to sixth molds, respectively, the first injection device is caused to perform primary injection to mold a first member, and the second and third injection devices are caused to perform primary injection to mold a second member and secondary injection to integrate the first and second members with each other, whereby the first and second members can be manufactured with different materials one after another.

1 Claim, 5 Drawing Sheets

(58) Field of Classification Search
USPC .............. 264/297.1, 297.3, 297.7, 297.8
See application file for complete search history.

(56) References Cited

FOREIGN PATENT DOCUMENTS

| | | |
|---|---|---|
| JP | H084830 | 1/1996 |
| JP | 2000071282 | 3/2000 |
| JP | 2000218661 | 8/2000 |
| JP | 2009023248 | 2/2009 |
| JP | 2011083959 | 4/2011 |

OTHER PUBLICATIONS

Shen-Zhang Hong, "Practical injection molding and mold design", Mechanical Industry Press, Feb. 2006, with English translation thereof, pp. 1-13.

"Office Action of China Counterpart Application," dated Sep. 11, 2018, with English translation thereof, p. 1-p. 15.

"International Search Report (Form PCT/ISA/210) of PCT/JP2015/083955", dated Feb. 9, 2016, with English translation thereof, pp. 1-4.

Office Action of China Counterpart Application, with English translation thereof, dated May 14, 2019, pp. 1-14.

\* cited by examiner

DEVICE FOR PRODUCING INJECTION MOLDED BODY AND METHOD OF PRODUCING THE SAME

CROSS-REFERENCE TO RELATED APPLICATION

This application is a 371 application of the international PCT application serial no. PCT/JP2015/083955, filed on Dec. 3, 2015, which claims the priority benefit of Japan application no. 2014-258589, filed on Dec. 22, 2014. The entirety of each of the abovementioned patent applications is hereby incorporated by reference herein and made a part of this specification.

TECHNICAL FIELD

The present invention relates to a device for producing an injection molded body such as a side turn lamp and a method of producing the same.

BACKGROUND ART

In general, there is proposed a hollow injection molded body such as a side turn lamp that is formed by molding (primary injection molding) a first member and a second member using a first mold and a second mold, sliding the molds until the first and second members abut each other, and performing secondary injection molding to integrate the both members (refer to Patent Document 1).

However, there are problems in that, since secondary injection is performed for integration after primary injection, production efficiency is low and costs increase.

Here, a technique in which a first mold is rotation type, mold surfaces of male, male, and female molds are formed on the first mold, and mold surfaces of male, female, and female molds are formed on a second mold, the first mold is rotated 120 degrees, and primary injection for molding first and second members and secondary injection for integrating the first and second members are repeated is known (refer to Patent Literature 2).

PRIOR ART LITERATURES

Patent Document

[Patent Document 1]
Japanese Examined Patent Application No. H2-38377
[Patent Document 2]
Japanese Examined Patent Application No. H8-4830

SUMMARY OF THE INVENTION

Problem to be Solved by the Invention

However, in the case of the first mold that is rotated, first and second members are the same material. Therefore, there is a problem in that it is not possible to continuously produce an injection molded body such as a side turn lamp in which first and second members are made of different materials, which is the problem to be solved by the present invention.

Technical Means Solving the Problem

The present invention has been made in view of the above circumstances. The first invention is an injection molded body producing device for producing a resin molded body in which, while a first member and a second member that are molded according to primary injection abut each other, secondary injection of a resin material into the abutting portion is performed for integration, the device including: a turntable configured to rotate the production device back and forth in a range of 120 degrees between a first position and a second position; first to third molds that are arranged on the turntable at an angle of 120 degrees; fourth to sixth molds that are provided to face the first to third molds and perform mold opening and mold clamping operations with respect to the first to third molds for contact and separation; first to third injection devices configured to inject a resin into the clamped molds; and a control unit configured to control rotation of the turntable back and forth, contact and separation operations of the fourth to sixth molds, and injection operations of the first to third injection devices. The first and second molds are female molds in which the injection molded first member remains when the mold is open, the third mold is a male mold from which the injection molded second member is separated when the mold is open, the fourth mold is a male mold from which the injection molded first member is separated when the mold is open, and the fifth and sixth molds are female molds in which the injection molded second member remains when the mold is open. When the turntable is located at the first position, the molds are disposed such that the first mold faces the fourth mold, the second mold faces the fifth mold, and the third mold faces the sixth mold, and when the turntable is located at the second position, the molds are disposed such that the first mold faces the sixth mold, the second mold faces the fourth mold, and the third mold faces the fifth mold. The injection operation controls of the control unit are set such that, when the turntable is located at the first position, the first injection device performs primary injection in order to mold the first member in the first and fourth molds, the second injection device performs secondary injection in order to integrate the first and second members for which primary injection is performed in the second and fifth molds, and the third injection device performs primary injection in order to mold the second member in the third mold and the sixth mold; and when the turntable is located at the second position, the third injection device performs secondary injection in order to integrate the first and second members for which primary injection is performed in the first and sixth molds, the first injection device performs primary injection in order to mold the first member in the second and fourth molds, and the second injection device performs primary injection in order to mold the second member in the third and fifth molds.

The second invention is the device for producing an injection molded body according to first invention, wherein the fourth to sixth molds are separately provided to perform mold clamping and mold opening operations.

The third invention is an injection molded body producing method for producing a resin molded body in which, while a first member and a second member that are molded according to primary injection abut each other, secondary injection of a resin material into the abutting portion is performed for integration, wherein the method is performed using a configuration that includes: a turntable configured to rotate the production device back and forth in a range of 120 degrees between a first position and a second position; first to third molds that are arranged on the turntable at an angle of 120 degrees; fourth to sixth molds that are provided to face the first to third molds and perform mold opening and mold clamping operations with respect to the first to third molds for contact and separation; first to third injection devices configured to inject a resin into the clamped molds;

and a control unit configured to control rotation of the turntable back and forth, contact and separation operations of the fourth to sixth molds, and injection operations of the first to third injection devices. The first and second molds are female molds in which the injection molded first member remains when the mold is open, the third mold is a male mold from which the injection molded second member is separated when the mold is open, the fourth mold is a male mold from which the injection molded first member is separated when the mold is open, the fifth and sixth molds are female molds in which the injection molded second member remains when the mold is open. When the turntable is located at the first position, the molds are disposed such that the first mold faces the fourth mold, the second mold faces the fifth mold, and the third mold faces the sixth mold, and when the turntable is located at the second position, the molds are disposed such that the first mold faces the sixth mold, the second mold faces the fourth mold, and the third mold faces the fifth mold. The injection operation controls of the control unit are performed by sequentially repeating a first process in which, when the turntable is located at the first position, the first injection device performs primary injection in order to mold the first member in the first and fourth molds, the second injection device performs secondary injection in order to integrate the first and second members for which primary injection is performed in the second and fifth molds, and the third injection device performs primary injection in order to mold the second member in the third mold and the sixth mold; and a second process in which, when the turntable is located at the second position, the third injection device performs secondary injection in order to integrate the first and second members for which primary injection is performed in the first and sixth molds, the first injection device performs primary injection in order to mold the first member in the second and fourth molds, and the second injection device performs primary injection in order to mold the second member in the third and fifth molds.

Effects of the Invention

According to the first and third invention, for an injection molded body in which first and second members are made of different materials, since primary injection molding is performed twice in order to mold the first and second members and a secondary injection process is performed to integrate the first and second members at the same time at first and second positions on the turntable that rotates back and forth in a range of 120 degrees, it is possible to increase production efficiency and reduce costs.

According to the second invention, when injection molding times of the first and second members are different, long or short, since mold opening is quickly performed on a member having a short injection molding time and another member can be incorporated therein, it is possible to further increase production efficiency.

DESCRIPTION OF THE EMBODIMENTS

Figure 1:
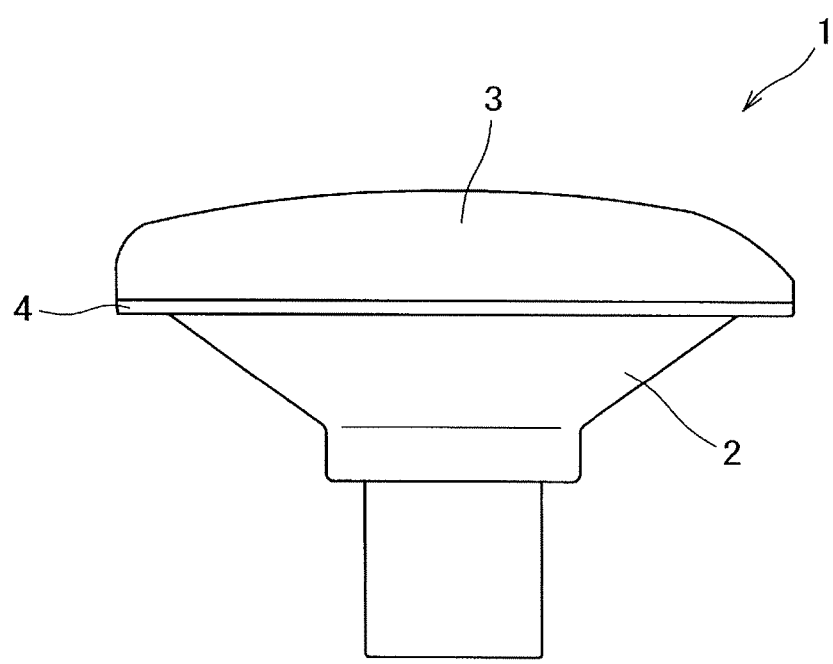
FIG. 1 is a side view of an injection molded body.
Figure 2:
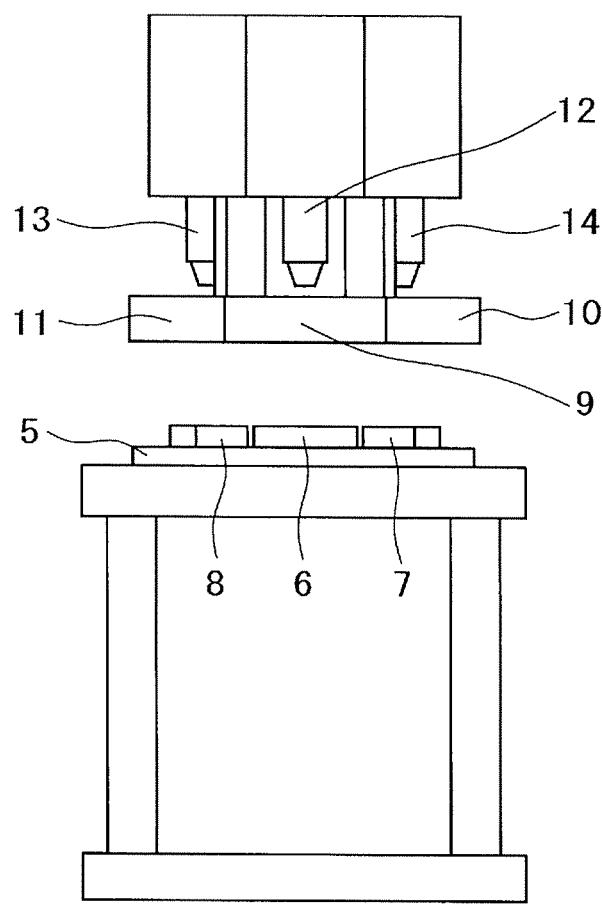
FIG. 2 is a schematic front view of an injection molding device.
Figure 3A:
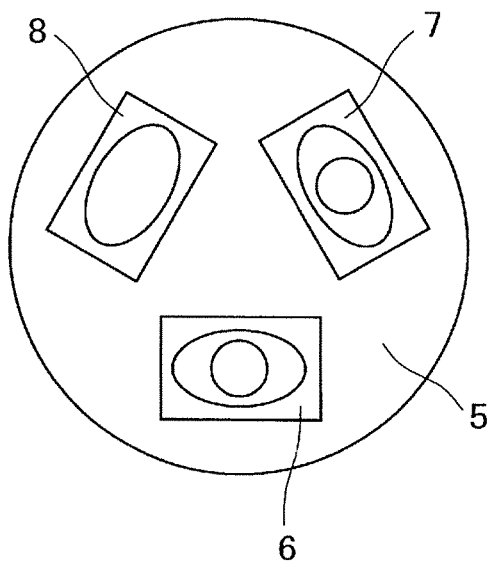
FIG. 3(A) is an operation explanatory diagram showing a state in which first to third molds are arranged.
Figure 3B:
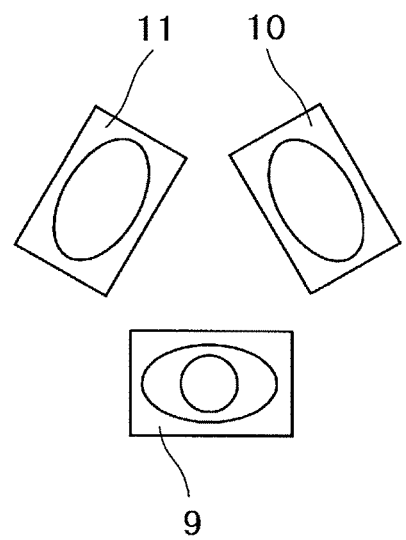
FIG. 3(B) is an operation explanatory diagram showing a state in which fourth to sixth molds and first to third injection devices are arranged.

Embodiments of the present invention will be described below with reference to the drawings. In the drawings, 1 indicates a hollow injection molded body. The injection molded body is molded by causing a first member (for example, a polycarbonate resin) 2 and a second member (for example, an acrylic resin) 3, which are made of different materials molded by primary injection, to abut and performing secondary injection of an integration resin (an integration resin) into the abutting portion. A device for producing the injection molded body 1 and a method of producing the same will be described below.

5 indicates a turntable, and the turntable 5 rotates back and forth in a range of 120 degrees between a first position and a second position. In the turntable 5, first, second, and third molds 6, 7, and 8 serving as lower molds are disposed at an angle of 120 degrees. The first and second molds 6 and 7 serve as female molds (molds in which the first member 2 remains when the mold is open) for molding the first member 2. The third mold 8 serves as a male mold (a mold from which the second member 3 is separated when the mold is open) for molding the second member 3.

Meanwhile, above the turntable 5, fourth to sixth molds 9, 10, and 11 serving as upper molds are disposed to correspond to stop positions of the first to third molds 6, 7, and 8, the fourth to sixth molds 9, 10, and 11 move up and down in order to clamp and open the first to third molds 6, 7, and 8 for vertical contact and separation movement, and first to third injection devices 12, 13, and 14 are provided to perform necessary injections. The fourth mold 9 is a male mold for molding the first member 2, and the fifth and sixth molds 10 and 11 are female molds for molding the second member 3. In addition, the first injection device 12 performs primary injection for molding the first member 2. The second and third injection devices 13 and 14 perform primary injection for forming the second member 3 and secondary injection for injecting the integration resin 4.

Then, movement control of rotation of the turntable 5 back and forth in a range of 120 degrees, contact and separation control of clamping and opening of the fourth to sixth molds 9, 10, and 11, and injection control of the first to third injection devices 12, 13, and 14 are performed according to instructions of a control unit (not shown).

Next, procedures of producing an injection molded body will be described with reference to FIGS. 4 and 5. First, for the molds 6 to 11, when the turntable is located at the first position (refer to FIG. 4(A)), the first mold 6 faces the fourth mold 9, the second mold 7 faces the fifth mold 10, and the third mold 8 faces the sixth mold 11. When the turntable 5 is rotated 120 degrees from the first position and is located at the second position (refer to FIG. 5(A)), the first mold 6 is disposed to face the sixth mold 11, the second mold 7 is disposed to face the fourth mold 9, and the third mold 8 is disposed to face the fifth mold 10.

Figure 4A:
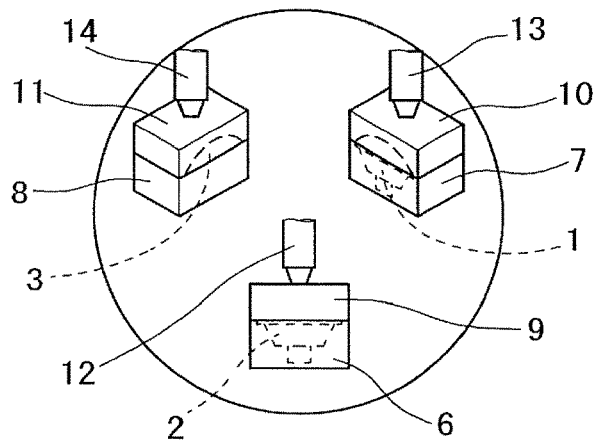
FIGS. 4(A) to 4(C) are operation explanatory diagrams showing the first half of injection molding processes.
Figure 4B:
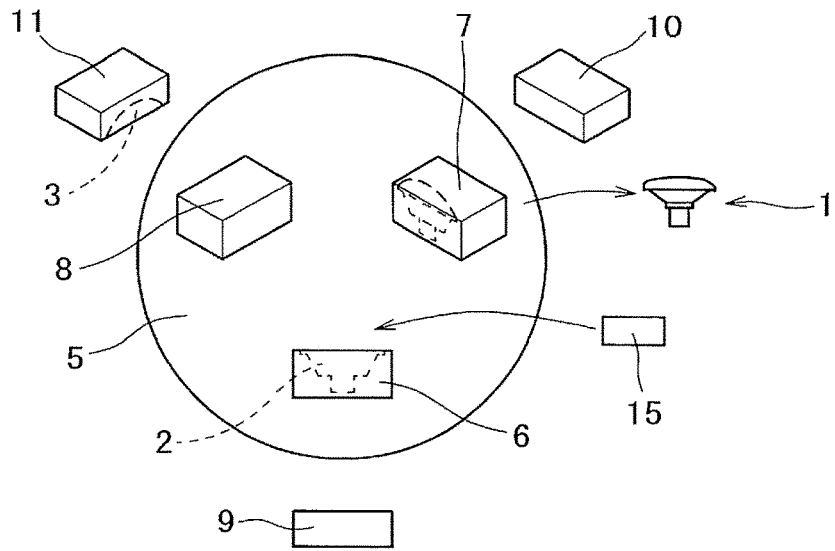

Then, when the fourth to sixth molds 9, 10, and 11 move and are clamped to the first to third molds 6, 7, and 8, respectively, primary injection of a resin material from the first injection device 12 is performed in order to mold the first member 2 between the first and fourth molds 6 and 9, secondary injection in which the integration resin 4 is injected to an abutting portion of the first and second members 2 and 3 from the second injection device 13 in the second and fifth molds 7 and 10 is performed in order to integrate the first and second members 2 and 3 that are molded in a second injection process to be described below, and primary injection in which a resin material is injected from the third injection device 14 is performed in order to mold the second member 3 between the third and sixth molds 8 and 11 (a first injection process: refer to FIG. 4(A)). Further, in the initial process in which the first and second members 2 and 3 are not molded, second injection from the second injection device 13 for integrating the first and second members 2 and 3 is not performed.

When the first injection process is completed, the fourth to sixth molds 9, 10, and 11 move to open the first to third molds 6, 7, and 8. In this case, the first member 2 remains in the first mold 6, the second member 3 remains in the sixth mold 11, the integrated injection molded body 1 is molded in the second mold 7 (refer to FIG. 4(B)), and the injection molded body that is molded 1 is demolded using an ejector pin (not shown) or the like to extract a product.

Figure 4C:
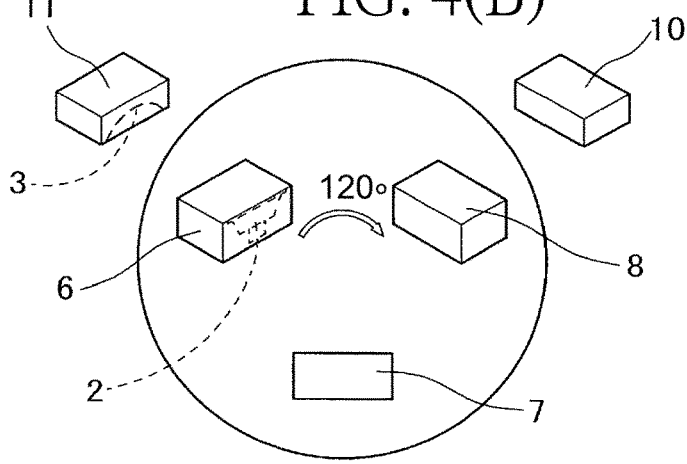

Next, the turntable 5 is rotated 120 degrees (clockwise in the present embodiment) so that the second and fourth molds 7 and 9, the third and fifth molds 8 and 10, and the first and sixth molds 6 and 11 face each other (refer to FIG. 4(C)).

Figure 5A:
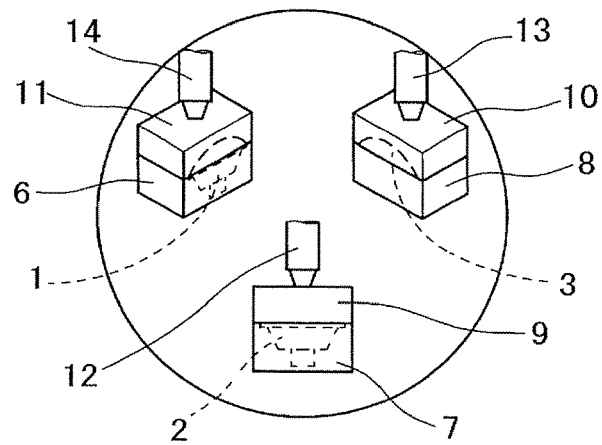
FIGS. 5(A) to 5(C) are operation explanatory diagrams showing the second half of injection molding processes.
Figure 5B:
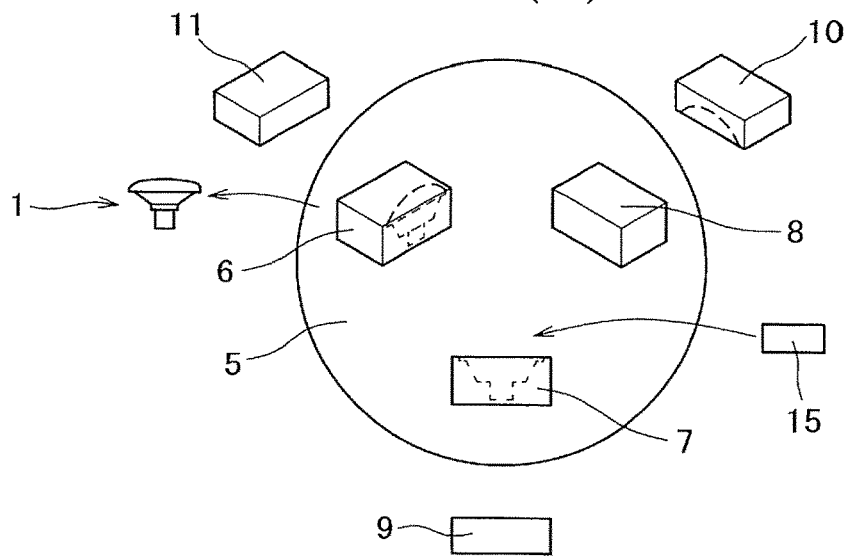

Then, the fourth to sixth molds 9, 10, and 11 are clamped to the second, third, and first molds 7, 8, and 6, the first injection device 12 performs primary injection in order to mold the first member 2 between the second and fourth molds 7 and 9, the second injection device 13 performs primary injection in order to mold the second member 3 between the third and fifth molds 8 and 10, and the third injection device 14 performs secondary injection of the integration resin 4 into an abutting portion of the first and second members 2 and 3 in the first and sixth molds 6 and 11 in order to integrate the first and second members 2 and 3 that are molded in the first injection process (a second injection process: refer to FIG. 5(A)).

Next, when the fourth to sixth molds 9, 10, and 11 are moved apart to open the molds, the first member 2 remains in the second mold 7, the second member 3 remains in the fifth mold 10, and the injection molded body 1 is produced and is extracted as described above (refer to FIG. 5(B)).

Figure 5C:
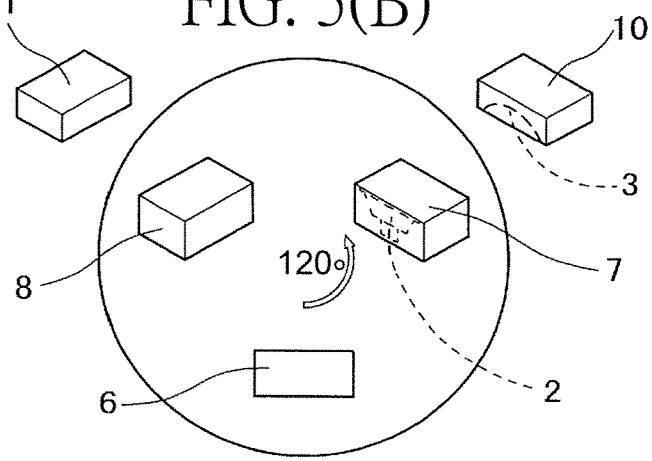

Then, when the turntable 5 is reversed 120 degrees (rotated counterclockwise), the first and fourth molds 6 and 9, the second and fifth molds 7 and 10, and the third and sixth molds 8 and 11 are disposed to face each other (refer to FIG. 5(C)), and the fourth to sixth molds 9, 10, and 11 are clamped, the process returns to the first injection process in FIG. 4(A). Thereafter, operations are set to be repeated in this order.

In the present embodiment described above, molding of the first member 2 and the second member 3 according to primary injection and molding according to secondary injection for integrating the molded first and second members 2 and 3 are simultaneously and continuously performed. In this case, the first injection device 12 provided on the side of the fourth mold 9 performs primary injection of the first member. The second and third injection devices 13 and 14 provided on the side of the fifth and sixth molds 10 and 11 alternately perform primary injection of the second member 3 and secondary injection for integrating the first and second members 2 and 3. As a result, even if the first and second members 2 and 3 are made of different materials, it is possible to produce the injection molded body 1 in series. Accordingly, production efficiency is improved.

In this case, when an injection molding time of the first member 2 is shorter than an injection molding time of the second member 3, if a mold opening operation of the fourth mold 9 is performed quickly and another member (a component such as a valve) 15 is incorporated into the first member 2 in the first and second injection processes, workability is further improved. When the other member 15 is incorporated within an injection molding time of the second member 3, a wasteful standby time is not consumed and workability is further improved.

INDUSTRIAL APPLICABILITY

The present invention can be used for a device for producing an injection molded body such as a side turn lamp and a method of producing the same.

What is claimed is:

1. An injection molded body producing method for producing a resin molded body in which, while a plurality of first members and a plurality of second members that are molded according to primary injection abut each other, secondary injection of a resin material into the abutting portion is performed for integration,
   wherein the method is performed using a configuration that comprises:
   a turntable configured to rotate the production device back and forth in a range of 120 degrees between a first position and a second position;
   first to third molds that are separately arranged on the turntable at an angle of 120 degrees;
   fourth to sixth molds that are provided to face the first to third molds and perform mold opening and mold clamping operations with respect to the first to third molds for contact and separation;
   first to third injection devices configured to inject a resin into the clamped molds; and
   a control unit configured to control rotation of the turntable back and forth, contact and separation operations of the fourth to sixth molds, and injection operations of the first to third injection devices,
   wherein the first and second molds are female molds in which the injection molded first members respectively remain when the mold is open,
   the third mold is a male mold from which the injection molded second member is separated when the mold is open,
   the fourth mold is a male mold from which the injection molded first member is separated when the mold is open, and
   the fifth and sixth molds are female molds in which the injection molded second members respectively remain when the mold is open,
   wherein, when the turntable is located at the first position, the molds are disposed such that the first mold faces the fourth mold, the second mold faces the fifth mold, and the third mold faces the sixth mold, and when the turntable is located at the second position, the molds are disposed such that the first mold faces the sixth mold, the second mold faces the fourth mold, and the third mold faces the fifth mold, and
   wherein injection operation controls of the control unit are performed by sequentially repeating
   a first process in which, when the turntable is located at the first position, the first injection device performs primary injection in order to mold the first members in the first and fourth molds, the second injection device performs secondary injection in order to integrate the first and second members for which primary injection is performed in the second and fifth molds, and the third injection device performs primary injection in order to mold the second members in the third mold and the sixth mold, and a second process in which, when the turntable is located at the second position, the third injection device performs secondary injection in order to integrate the first and second members for which primary injection is performed in the first and sixth molds, the first injection device performs primary injection in order to mold the first members in the second and fourth molds, and the second injection device performs primary injection in order to mold the second members in the third and fifth molds.

* * * * *